(12) United States Patent
Gill et al.

(10) Patent No.: US 7,424,387 B1
(45) Date of Patent: Sep. 9, 2008

(54) METHOD FOR USE WITH AN OPTICAL ALIGNER SYSTEM FOR POSITIONING A FIXTURE RELATIVE TO A VEHICLE

(75) Inventors: George M. Gill, Vilonia, AR (US); David A. Jackson, Point Roberts, WA (US); Steve L. Glickman, Los Gatos, CA (US); Stephen K. Rigsby, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/785,586

(22) Filed: Apr. 18, 2007

(51) Int. Cl.
*G01B 5/25* (2006.01)
*G01B 11/275* (2006.01)

(52) U.S. Cl. .................... 702/150; 33/288
(58) Field of Classification Search .............. 702/150
See application file for complete search history.

(56) References Cited

U.S. PATENT DOCUMENTS

| | | | |
|---|---|---|---|
| 5,024,001 A | 6/1991 | Borner et al. | |
| 5,535,522 A | 7/1996 | Jackson | |
| 5,724,743 A | 3/1998 | Jackson | |
| 5,809,658 A | 9/1998 | Jackson et al. | |
| 5,943,783 A | 8/1999 | Jackson | |
| 6,148,528 A * | 11/2000 | Jackson | 33/288 |
| 6,237,234 B1 | 5/2001 | Jackson et al. | |
| 6,313,911 B1 | 11/2001 | Stieff | |
| 6,483,577 B2 | 11/2002 | Stieff | |
| 6,532,062 B2 * | 3/2003 | Jackson et al. | 356/139.09 |
| 6,560,883 B2 | 5/2003 | Jackson et al. | |
| 6,658,751 B2 * | 12/2003 | Jackson et al. | 33/293 |
| 6,661,505 B2 | 12/2003 | Jackson et al. | |
| 6,731,382 B2 | 5/2004 | Jackson et al. | |
| 6,823,601 B2 * | 11/2004 | Murray | 33/288 |
| 6,839,972 B2 | 1/2005 | Jackson et al. | |
| 6,931,340 B2 | 8/2005 | Jackson et al. | |
| 6,959,253 B2 | 10/2005 | Jackson et al. | |
| 6,968,282 B1 | 11/2005 | Jackson et al. | |
| 7,089,776 B2 | 8/2006 | Dale, Jr. | |
| 7,121,011 B2 * | 10/2006 | Murray et al. | 33/288 |
| 7,206,716 B2 * | 4/2007 | Davidson et al. | 702/151 |
| 2005/0041847 A1 | 2/2005 | Dorrance et al. | |
| 2005/0234615 A1 * | 10/2005 | Rigsby et al. | 701/29 |

FOREIGN PATENT DOCUMENTS

WO WO 2004/102114 A1 11/2004

* cited by examiner

*Primary Examiner*—Michael P. Nghiem
*Assistant Examiner*—Cindy H Khuu
(74) *Attorney, Agent, or Firm*—McDermott Will & Emery LLP (57) ABSTRACT

A method is provided for positioning a free-standing fixture relative to a vehicle, using a visual aligner system for imaging vehicle-mounted targets with reference image sensors and processing the resultant images. Embodiments include calculating locations of the vehicle-mounted targets, calculating a location of a reference point on the vehicle, and determining a longitudinal line along a longitudinal axis of the vehicle. A location of a center of the fixture and an axis of the fixture is then calculated based on an image of one of the targets obtained by a remote image sensor attached to the fixture. The fixture is positioned by adjusting the fixture relative to the vehicle to achieve a desired position or orientation of the fixture based on the performed comparison steps and angle calculations.

20 Claims, 7 Drawing Sheets

METHOD FOR USE WITH AN OPTICAL ALIGNER SYSTEM FOR POSITIONING A FIXTURE RELATIVE TO A VEHICLE

TECHNICAL FIELD

The present subject matter relates to techniques to position a free-standing fixture relative to a vehicle, such as a fixture for supporting equipment to adjust or align a sensor mounted to the vehicle, in part using an image processing type aligner, such as a 3D visual system otherwise used for alignment of the wheels of the host vehicle.

BACKGROUND ART

A number of automobile manufacturers offer systems as comfort and/or safety aids for driving, which include sensors aimed for performed functions related to these systems. Such systems include, but are not limited to, adaptive cruise control and lane departure warning. Adaptive cruise control (ACC) systems provide an adaptive vehicle speed control, based on sensing of another vehicle or target in front of the host vehicle within which the cruise control operates, for example to reduce host vehicle speed and maintain a set distance between the vehicles. Lane departure warning (LDW) systems sense when a vehicle is straying from one lane of traffic and entering another, and provide a warning to the driver. ACC and LDW systems typically utilize a video camera, radar or laser sensor or the like to detect the presence of and distance to a target vehicle and/or traffic lane markings leading the host vehicle on which the sensor and the ACC or LDW system are mounted. Such sensors are now commonly mounted on motor vehicles, such as cars, trucks, lorries, vans and the like, and are typically located to the front of the host vehicle, and direct a video camera, radar or laser beam in the direction of forward motion of the motor vehicle.

In order for a system such as an ACC or LDW system to operate properly, the sensor must be adjusted (i.e., "aimed") relative to the vehicle; for example, certain ACC and LDW sensors must be accurately aligned with a longitudinal line of the vehicle, such as the vehicle thrust line. The thrust line of a vehicle is determined by the toe of the rear wheels of the vehicle, and techniques for measurement thereof will be well known to those skilled in the art. It is a line that extends from the point of intersection of the rear transverse axis of the rear wheels and the longitudinal center line of the vehicle, and it extends forwardly of the vehicle at an angle to the center line of the vehicle. The angle that the thrust line makes with respect to the center line of the vehicle is determined by the toe of the rear wheels, and is relatively small; for example, as close to zero as possible.

It is well known to align the front and rear wheels of a vehicle with alignment devices or systems. Modern wheel alignment systems, providing increased accuracy and ease of use, have relied on visible targets and computer processing of camera images of the wheel mounted visible targets. Such systems are often referred to as 3D image wheel aligner systems. Examples of methods and apparatus involving computerized image processing for alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels." A wheel alignment system of the type described in these references is sometimes called a "3D aligner" or "visual aligner." An example of a commercial vehicle wheel aligner is the Visualiner 3D, commercially available from John Bean Company of Conway, Ark., a unit of Snap-on Inc.

Devices for aligning sensors, such as an axis of an ACC or LDW sensor, are also known, and generally include an alignment element such as a mirror or an optical target carried by a stand to be placed in front of the vehicle in the line of sight of the sensor. Such stands typically are not connected to the vehicle, and can have wheels to allow them to be easily moved. To perform a sensor alignment, the alignment element must be positioned and oriented accurately in front of the vehicle according to the vehicle manufacturer's specifications. Depending on the manufacturer's specifications, the alignment element may have to be adjusted in up to six different degrees of freedom; e.g., distance in front of the vehicle, left-to-right centering, perpendicularity to the thrust line, height, orientation about a horizontal axis, and orientation about an axis along the thrust line.

Techniques for using a visual aligner system to adjust an alignment element perpendicular to a vehicle thrust line are described in U.S. Pat. No. 6,823,601, entitled "Apparatus for use with a 3D image wheel aligner for facilitating adjustment of an adaptive cruise control sensor on a motor vehicle," and U.S. Pat. No. 7,121,011, entitled "Camera technique for adaptive cruise control (ACC) sensor adjustment." However, it would be advantageous to use a 3D image wheel aligner to adjust an alignment element in other degrees of freedom, because certain sensors require alignment element(s) to be adjusted in multiple degrees of freedom before being aligned. For example, LDW sensors require accurate positioning and orientation in at least three degrees of freedom; i.e., distance in front of the vehicle, left-to-right centering, and perpendicularity to the thrust line.

Hence, a need exists for a technique for use with a visual aligner system, such as used for wheel alignments, to allow the aligner to also position a fixture relative to a host vehicle in more than one degree of freedom.

SUMMARY

Techniques and equipment are contemplated for aligning a fixture relative to a host vehicle, using an image sensor of an image processing type aligner and a stand, to properly set up the fixture to perform an adjustment.

According to the present disclosure, the foregoing and other advantages are achieved in part by a method of positioning a free-standing fixture relative to a vehicle, using a visual aligner system for imaging vehicle-mounted targets with reference image sensors and processing the resultant images. The method comprises calculating locations of the vehicle-mounted targets based on the images of the targets obtained by the reference image sensors, calculating a location of a reference point on the vehicle, and determining a longitudinal line along a longitudinal axis of the vehicle. A remote image sensor is attached to the fixture at a predetermined mounting point on the fixture, and the fixture is positioned to allow imaging of one of the targets with the attached remote image sensor. A location of a center of the fixture and an axis of the fixture is then calculated based on an image of one of the targets obtained by the remote image sensor.

The fixture is positioned by performing at least one of the steps of comparing the intersection of the longitudinal line and the axis of the fixture with the center of the fixture, comparing the location of the center of the fixture and the location of the reference point, comparing the location of the center of the fixture and a reference plane calculated by the visual aligner, and comparing the location of the axis of the fixture and the reference plane, and adjusting the fixture relative to the vehicle to achieve a desired position or orientation of the fixture based on the performed comparison steps and angle calculations.

Those skilled in the art will recognize that the techniques described herein may be adapted to other applications. For example, the stand, the auxiliary image sensor and the adjustment elements could be used in combination with a visual image processing type system to align other types of sensors, e.g. including other sensors that may now or in future appear at different locations on various types of vehicles.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein:

FIG. 6b is a side view of the fixture and vehicle of FIG. 6a.

DETAILED DESCRIPTION

A technique for positioning a fixture relative to a vehicle, such as a stand supporting an adjustment element for aligning an adaptive cruise control sensor or lane departure warning sensor mounted on the front of a host vehicle, utilizes an image processing aligner (a "visual aligner"). The aligner includes one or more image sensors and a processor for processing image signals from the image sensors so as to compute alignment parameters, for example, parameters relating to wheel alignment of the vehicle. The aligner uses two or more optical targets, which may be mounted on the vehicle. For a sensor-related application, the aligner also serves to align one or more optical adjustment elements used in the adjustment and alignment of the vehicle mounted control sensor.

Figure 3:
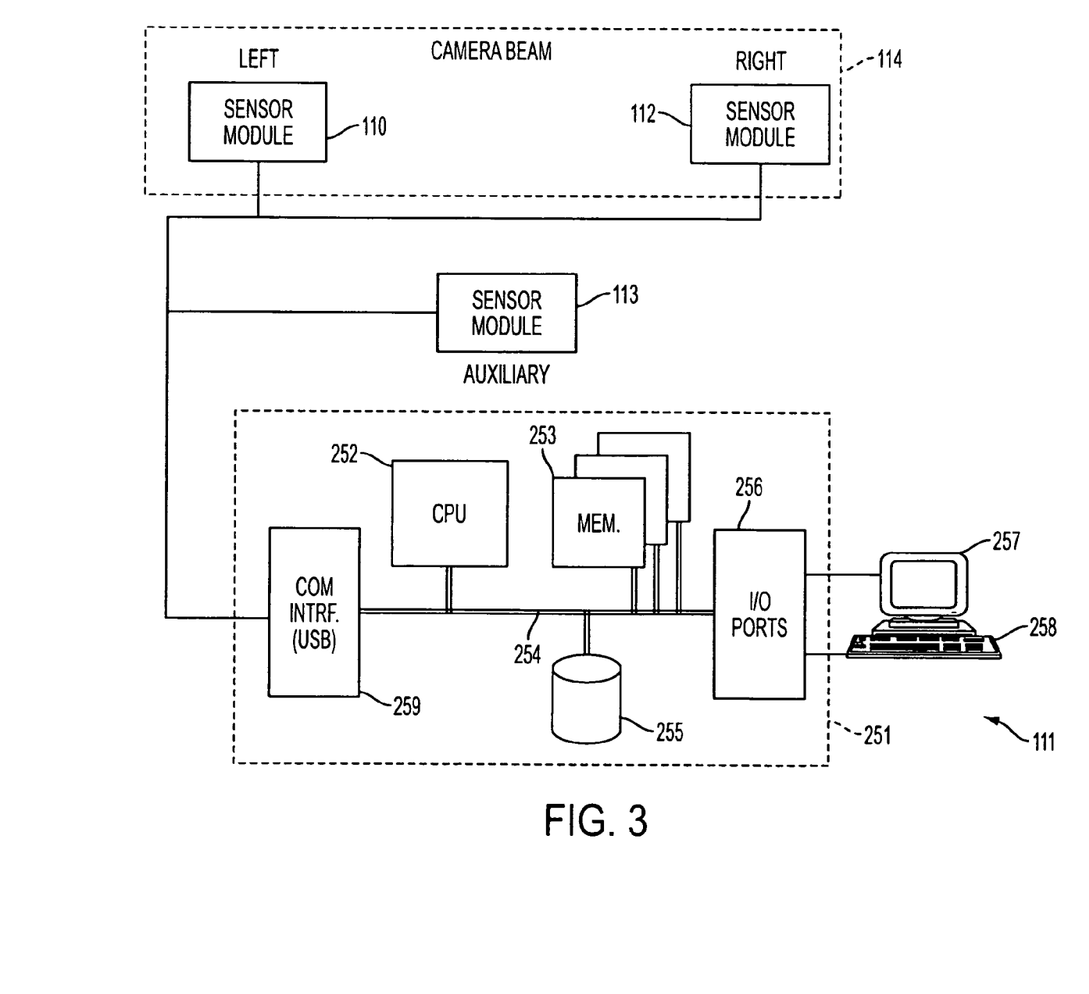
FIG. 3 is a simplified functional block diagram of the image processing components of the aligner of FIGS. 1 and 2.
Figure 4A:
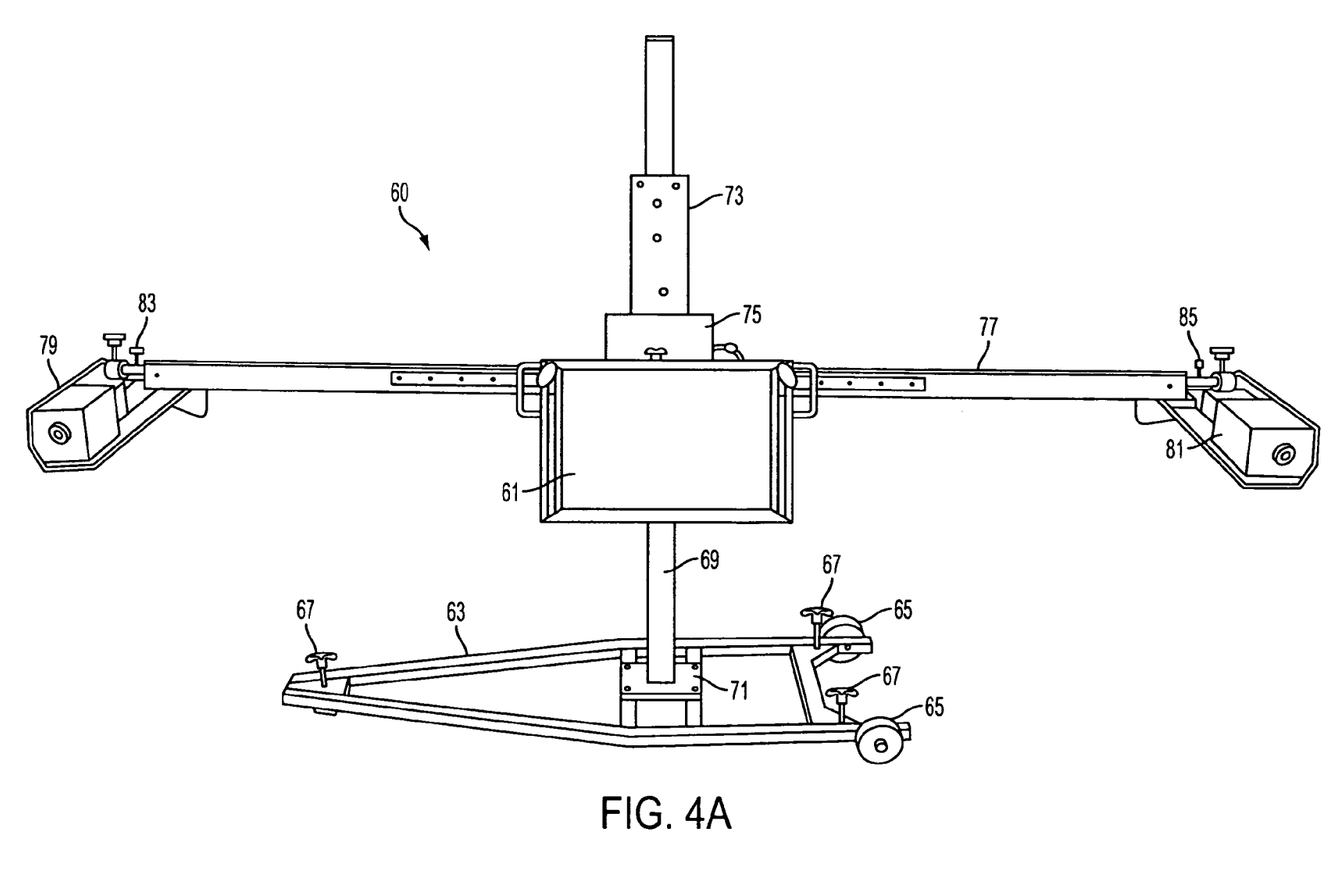
FIGS. 4a and 4b are front and back views of an example of a stand, an adjustment element and two camera modules of an image processing type wheel aligner for facilitating adjustment of a sensor.

For sensor alignment, a fixture is provided for location across a line of interest of the host vehicle, such as across a thrust line of the vehicle. The fixture supports an adjustment element, such as a mirror or optical target. The fixture also supports at least one image sensor, referred to herein as a "remote image sensor", at a location transversely spaced apart from the adjustment element and/or an axis of the host vehicle, to enable imaging of at least one of the targets on the vehicle. An example of the fixture structure will be discussed in detail, below, with respect to FIGS. 4a and 4b. The examples of FIGS. 1 and 3 use one image sensor on the fixture. However, the exemplary fixture shown in FIGS. 4a and 4b may support image sensing modules at either or both ends of a cross-bar, and the examples of FIGS. 4a and 5b are shown with two remote image sensors. The aligner processes images from the image sensor(s) on the fixture, to facilitate alignment of the optical adjustment element relative to the vehicle, in relation to a thrust line or some other measured characteristic of the vehicle.

Figure 1:
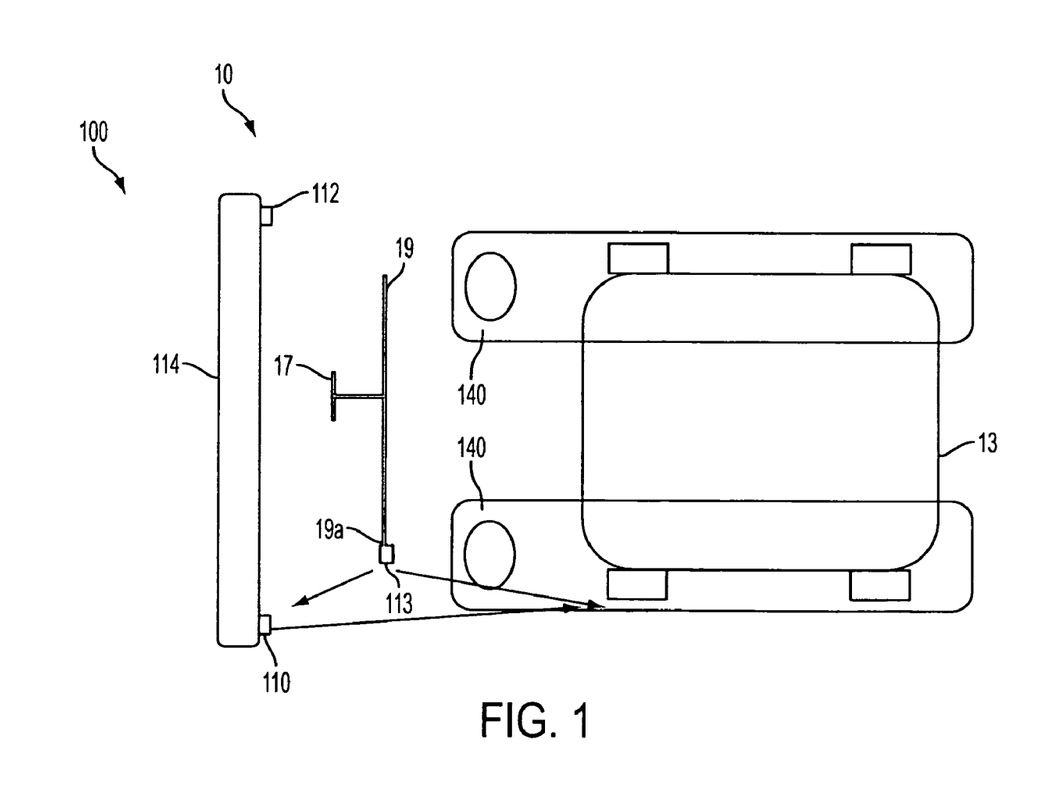
FIG. 1 is a diagrammatic plan view of an image processing type wheel aligner, fixture and adjustment element, in use for adjusting a sensor located towards the front of a host vehicle.

Referring to FIG. 1, there is illustrated a system 10 for positioning a fixture 19 relative to a host vehicle 13, while the vehicle is on ramps of a service rack 140. The fixture 19 typically is for carrying an adjustment element 17, such as a mirror or target, for adjusting the radar or laser sensor or the like of an adaptive cruise control (ACC) or lane departure warning (LDW) system. Fixture 19 supports the adjustment element 17 in front of the vehicle 13, and is typically part of or mounted on a movable, adjustable stand, and shown in FIGS. 4a and 4b.

The system 10 also includes a 3D imaging type aligner system 100, several portions of which are shown diagrammatically in FIG. 1. The exemplary aligner system 100 includes two image sensor modules 110 and 112, also referred to herein as "reference image sensors," mounted near the opposite ends of a support beam 114. A person skilled in the art will recognize that various other camera configurations can be used, and a beam connecting the cameras is not essential. The vehicle sensor adjustment techniques may work with any of these 3D imaging type aligner systems, with one or any plural number of cameras in such image sensor modules. For ease of discussion, we will concentrate on examples using the two-module arrangement of the aligner system 100 shown in FIGS. 1-3.

The modules 110 and 112 include digital cameras or the like, as the actual image sensors. Each of image sensor modules 110 and 112 is oriented so that its respective field of view encompasses two wheels on the respective side of the vehicle 13. Optical targets are mounted on the wheels, as discussed below relative to FIG. 2, although for convenience, the targets are omitted from FIG. 1. A computer processes the signals from the image sensor modules 110 and 112 to determine target positions and derive alignment measurements for the vehicle 13 under test.

To perform its adjustment function, adjustment element 17 must be precisely aligned with respect to the vehicle 13. The wheel alignment system 100 therefore takes additional measurements to determine and allow adjustment of the fixture 19 to achieve the correct positioning and orientation of the adjustment element 17. In accord with the principles discussed herein, the aligner system 110 has at least one image sensor module 113, also referred to herein as a remote image sensor, mounted to the fixture 19. One of the normal modules 110 or 112 could be detached from the support beam 114 and attached to the fixture 19, but to maintain accurate system calibration, it is recommended here that the system 100 utilize at least one separate remote camera or sensor module 113 mounted on the fixture 19. In the example, one auxiliary sensor module 113 is used, but it may be convenient to use to two such modules (as shown in FIG. 5b).

Hence, the fixture positioning method involves attachment of at least one auxiliary image sensor module at one or more points on the fixture, for example, attachment of the image sensor module 113 to one side of the fixture 19. In this position, the camera in the module 113 is able to view one or more of the aligner's targets (see FIG. 2). By doing so, the processing of the signals from the auxiliary camera in the module 113, in the same manner as for the other aligner cameras, is able to determine the positions and orientations of these targets in its own coordinate system.

Through performing a normal wheel alignment, the aligner 100 is capable of determining the positions and orientations of the targets viewed by its cameras (in modules 110 and 112) in the coordinate system of the aligner. By doing so, the aligner system 100 will also have determined the thrust line of the vehicle 13, using the measurements of toe of the rear wheels. After such normal alignment measurements, the stand carrying fixture 19 with adjustment element 17 may be placed between the vehicle 13 and the aligner beam 114. The remote sensor module 113 is attached to either end of the fixture 19. The auxiliary camera in module 113 then provides images of the targets of front and/or back wheels on its side of vehicle 13, and the computer in the aligner system 100 determines the positions of the front target and/or both front and rear targets on its side. This position determination is relative to the auxiliary camera's coordinate system.

With the aligner already having the positions and orientations of the targets in the aligner's coordinate system, it is possible to derive similar data from images from the remote module's camera and then determine the position and orientation of the auxiliary camera's coordinate system in relation to the coordinate system of the aligner system 100. If the orientation of the auxiliary camera (in remote module 113) is known with respect to the fixture 19 (and the adjustment element 17), then it is also possible to determine the position of the fixture 19 with respect to the aligner's coordinate system. Using this information enables the aligning of the fixture 19 relative to various measured parameters associated with the vehicle 13.

To determine the orientation of the auxiliary camera with respect to the fixture 19, it will be necessary to calibrate the relationship of the auxiliary camera to the fixture 19. A special bracket may be required to rotatably attach the remote image sensor 113 to the fixture 19, although this bracket may be similar to mounting elements typically used to attach modules 110 and 112 to the beam 114. In the example shown in FIG. 1, the fixture 19 comprises a substantially horizontal bar, having a predetermined mounting point 19*a* for the remote image sensor 113 at a distal end of the bar.

The concepts discussed herein are applicable in a variety of different types of image processing alignment systems, for vehicles and the like. Presumably, those skilled in the art are familiar with the structure and operation of such machine vision alignment systems. However, it may be helpful to consider a specific example of a machine vision system, such as a 3D wheel aligner as illustrated in FIGS. 2 and 3.

In the example shown, the aligner system 100 consists of three major components. The first of these elements is an illumination and imaging system 102. This portion of the system comprises two imaging modules 110, 112. Each of the imaging modules 110, 112 includes a light emitter or illumination system (typically a strobe). Each of the imaging modules 110, 112 also includes an image sensor, typically in the form of a digital camera. Any suitable type of cameras, such as CCD or CMOS based cameras, may be used. Essentially, each camera forms an image of objects within its field of view, which in operation includes one or more targets; and in response to the image each camera generates digital image data. Circuitry in the module formats the digital image signal and may perform some pre-processing, and then sends the resultant data to a host computer 111.

Each light emitter takes the form of an array of strobed (flashing) LEDs mounted around the aperture of one of the cameras. The exemplary system uses high-resolution digital cameras. The imaging modules 110 and 112 are mounted at opposite ends of a horizontal beam 114. In the wheel alignment application, the beam provides desired separation between the modules, to allow the desired view of the vehicle wheels from opposite sides. The height of the beam, and thus the height of the cameras in the modules 110 and 112, may be fixed or adjustable. The structure of the beam 114 and the structure for supporting the beam 114 are not significant for purposes of this discussion. Those skilled in the art will recognize that machine vision applications, including wheel alignment, may use a single imaging module or use more than the two modules 110, 112 shown in the example. In addition, the camera modules may be related to each other using techniques other than a beam, as discussed in U.S. Pat. Nos. 6,731,382, 6,839,972, 6,931,340, 6,959,253, and 6,968,282. For fixture and sensor adjustment, the system includes at least one remote image sensor module 113. The structure and operation of the module 113 are generally the same as those of the modules 110, 112.

Figure 2:
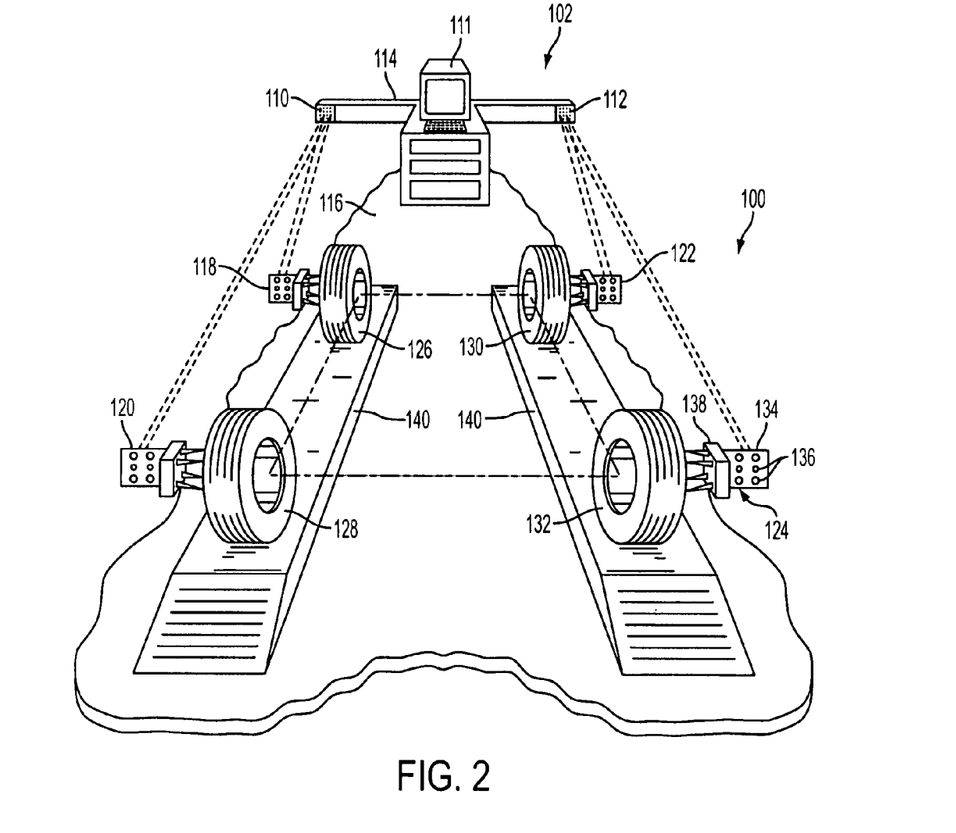
FIG. 2 is a perspective view of an image processing type wheel alignment system shown in relation to the wheels of a vehicle (vehicle body not shown) and the supporting platform.

The second major element of the aligner 3D system is a set of four passive heads, 118, 120, 122 and 124 for attachment to the vehicle wheels 126, 128, 130 and 132 (see FIG. 2). Each head includes a wheel-rim clamp and an attached target object. In the example, each target object has a planar surface with a plurality of visually perceptible, geometrically configured, retro-reflective target elements, which appear as a pattern of reflective circles or dots of different sizes on the planar surface. Examples of target bodies 134 and target elements 136 acceptable for use in wheel alignment applications are described in U.S. Pat. No. 5,724,743. Other target designs may be used for wheel alignment, for example with different visually perceptible target elements 136 or non-planar targets.

In the wheel alignment application, targets 118, 120, 122, 124 are mounted on each of the wheels 126, 128, 130, 132 of the motor vehicle. Each target 118, 120, 120, 124 includes a target body 134, target elements 136, and an attachment apparatus 138. The target elements 136 are positioned on the target body 134. The attachment apparatus 138 attaches the target 118, 120, 120, 124 to wheel 126, 128, 130, 132, respectively. An example of an attachment apparatus is described in U.S. Pat. No. 5,024,001, entitled "Wheel Alignment Rim Clamp Claw" issued to Borner et al. on Jun. 18, 1991, incorporated herein by reference. Of course, other mounting arrangements may be used.

The beam 114 supporting the imaging modules 110 and 112 has a length sufficient to position the cameras in the modules 110, 112 respectively outboard of the sides of the vehicle to be imaged by the position determination system 100. Also, the beam 114 positions the cameras in the modules 110, 112 high enough above the wheels to ensure that the two targets 118, 120 on the left side of the vehicle are both within the field of view of the left side camera in module 110, and the two targets 122, 124 on the right side of the vehicle are both within the field of view of the right side camera in module 112.

The other major element of the aligner system 100 is a programmed computer or host 111, typically a personal computer or similar programmable data processing device. In a typical implementation, the computer 111 includes a processor, a keyboard, a mouse, a printer and a color display monitor, as will be discussed in more detail below. In the wheel alignment example, the computer 111 is programmed to receive and process the image data from the imaging modules 110 and 112. The host computer 111 processes the received data to calculate alignment parameters for a vehicle and to provide a graphical three-dimensional representation of those parameters as a display to a mechanic. In general, the host processing system 111 processes digital image information to derive positional data regarding position of the visually perceptible target elements from the camera images; and the host processing system 111 processes the positional data to determine one or more wheel alignment parameters of the vehicle under test. The computer 111 also offers a variety of other information useful in adjusting vehicle alignment. The computer also provides the user interface for operation of the system.

In operation, once the wheel aligner system 100 has been calibrated in a known manner, a vehicle 13 can be driven onto the rack 140, and, if desired, the vehicle lifted to an appropriate repair elevation. The targets 118, 120, 122, 124, once attached to the wheel rims, are then oriented so that the target elements 136 on the target body 134 face the camera in the respective module 110 or 112. The camera height may be fixed or adjustable to correspond to lift height. The vehicle and model year can then be entered into the computer 111 along with other identifying parameters, such as vehicle VIN number, license number, owner name, etc.

To take measurements, the mechanic begins by operating the system 100 to take a first set of images of the targets 118, 120, 122 and 124. The mechanic then rolls the vehicle back a slight distance, up to eight inches; and the system 100 takes another set of images of the targets 118, 120, 122 and 124. Finally, the mechanic rolls the vehicle forward to its initial position, and the system 100 takes more images. For each of the images, the respective module 110 or 112 may perform pre-processing of the image data, and the module forwards the to the host computer 111 for further processing. For example, from the position and orientation of the target in the images taken at the various positions, the computer 111 calculates the actual position and orientation of each wheel axis, including certain alignment parameters such as toe, camber, thrust angle and setback.

In the exemplary system 100, one camera is referenced to the other, so that the host computer 111 utilizes a single coordinate system for modeling the vehicle 13 under test. For example, camera 110 can be used as the point of origin of the aligner's single coordinate system, as will be used later in the fixture adjustment technique. It is not necessary that the supporting rack 140 be level or even that all wheels lie within the same plane.

For each vehicle, the computer 111 defines a reference plane, also called a "vehicle plane," that passes through the centers of rotation of the wheels (called "claw points" because they are the center of the points where the claws of the target assembly grip the wheel rims) as determined from the two test images taken at different positions of the wheels. It is possible that one of these claw points may not lie in the plane defined by the other three. Therefore, for the purpose of aligning the front wheels 126, 130, the computer 111 defines a reference plane as that formed by the measured claw point location of each of the two front wheels and a point midway between the measured claw point locations of the rear wheels 128, 132. Front wheel alignment calculations then are referenced to this individually measured plane. A similar technique may be used to reference measurements and adjustments with respect of the rear wheels.

The front wheels 126, 130 of the vehicle may rest on turntables (not shown), so that the mechanic can operate the steering wheel of the vehicle to change the positions of the front wheel during alignment operations. For example, the mechanic will operate the system 100 to take an image of the targets 118, 120, 122 and 124 with the wheels 126, 130 turned to one side. The mechanic then turns the wheels 126, 130 to the other side; and the system 100 takes another image of the targets 118, 120, 122 and 124. From the position and orientation of the front targets 118, 120 in these images taken at the two turned positions, the computer 111 calculates the steering axis about which each front wheel 126 or 130 turns.

Proper operation of a visual aligner system requires that the targets are within the field of view of the cameras in the imaging modules 110, 112 and 113. The spacing is dependent at least in part on the size of the targets. For example, with the targets used in the VISUALINER 3D system, the targets normally must be at least 1.3 m away from the cameras so that the aligner's target acquisition algorithm can detect the targets. The centers of the turntables (not shown) on which the front wheels rest during wheel alignment normally are 2.7 m away from the cameras. Of course, those skilled in the art will recognize that other dimensions would be appropriate for other types/sizes of targets.

Once all measurements are complete, the computer 111 generates a visual output of the measured alignment parameters and/or provides data relating to adjustments needed to bring the alignment parameters back to original manufacturer's specifications. The computer 111 stores manufacturers' specified values and tolerances for the alignment parameters, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system 111 can provide visual displays and/or printouts, for purposes of billings, reports to the customer, etc. Of note for purposes of the fixture adjustment methodology, the above discussed alignment processing measures and if necessary allows correction of "toe." The resulting correct toe may be stored and used to calculate the vehicle thrust line, with which the fixture may be aligned.

A host system 111 may be implemented on a specifically designed processing system, but in the example, it is implemented by a general-purpose computer controlled by software programming. Of course any of a number of different types of computer may be used, for wheel alignment or other applications; however, the example utilizes a device within the class commonly referred to as a personal computer or "PC." Although those familiar with the machine vision arts and/or the data processing art will generally be familiar with such computers and their associated software, it may be helpful to summarize the structural and functional aspects thereof as they might relate to the wheel alignment and fixture adjustment example of FIGS. 1 and 2.

FIG. 3 provides a functional block diagram of the electronic processing elements of the machine vision system serving as the aligner 100. As shown, the system includes the image sensor modules 110 and 112 mounted on the camera beam 114 as well as the remote or auxiliary image sensor module 113. Each sensor module includes a communication interface, such as a USB interface or the like, to enable data communications with the host computer.

In the example of FIG. 3, the system utilizes a PC or workstation type implementation of a host computer system 251, which may serve as the host computer 111. In such an application, one function of the system 251 is to process the image data from the sensor modules 110 and 112 to determine wheel alignment parameters. The system 251 performs similar processing of image data from auxiliary sensor module 113. The system may run a number of other programs that are useful to the mechanic and/or other personnel in the auto shop.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications. For purposes of the wheel alignment application, the interface 259 provides two-way data communications with the various imaging modules 110, 112 and 113. For example, the interface 259 may be a USB hub providing three or more ports for USB cable links to/from the imaging modules 110, 112 and 113. Although not shown, another communication interface may provide communication via a network, if desired. Such an additional interface may be a modem, an Ethernet card or any other appropriate data communications device.

The physical links to and from the communication interface(s) may be optical, wired, or wireless. For example, in a typical wheel aligner application, the imaging modules connect via USB cables. However, infrared, RF, and broadband wireless technologies may be used for these links. Any external communications may use hard wiring or wireless technologies.

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display, plasma screen or liquid crystal display (LCD). Although not shown, the PC type system 111 typically would include a port for connection to a printer. The input control devices for such an implementation of the system 251 would include the keyboard 258 for inputting alphanumeric and other key information. The input control devices for the system 251 may further include a cursor control device (not shown), such as a mouse, a touchpad, a trackball, a stylus, or cursor direction keys. The links of the peripherals 257, 258 and the like to the system 251 may be wired connections or use wireless communications.

The computer system 251 typically runs an operating system and a variety of applications programs, and the system stores data. Programmed operations of the system enable one or more interactions via the user interface, provided through elements such as 257 and 258, and implement the desired image processing. For machine vision applications, like wheel alignment and ACC sensor adjustment, the programming will include appropriate code to process the image data to produce the desired machine vision results. For example, when used to implement the host computer 111 for the wheel alignment system the programming enables the device 251 to process the image data to determine the desired alignment parameters. The programming will also process image data from the auxiliary module 113 to determine its coordinate system and derive the orientation of the stand 19 and/or the adjustment element 17 from the difference from the aligner's own coordinate system. The host 111 will typically run an application or shell specifically adapted to provide the user interface for input and output of desired information for alignment and related services. As noted, because it is a general purpose system, the device 251 may run any one or more of a wide range of other desirable application programs, some of which may involve machine vision but many of which may not.

The components contained in the computer systems 251 are those typically found in general purpose computer systems used as servers, workstations, personal computers, network terminals, and the like. In fact, these components are intended to represent a broad category of such computer components that are well known in the art.

At various times, the relevant programming for machine vision processing and any related application(s), such as the wheel alignment application and fixture or sensor adjustment, may reside on one or more of several different media. For example, the programming may be stored on a hard disk and loaded into RAM for execution. The programming also may reside on or be transported by other media for uploading into the system 251, to essentially install the programming. Hence, at different times all or portions of the executable code or data for any or all of these software elements may reside in physical media or be carried by electromagnetic media or be transported via a variety of different media to program the particular system.

As used herein, terms such as computer or machine "readable medium" therefore refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in the computer 251 of FIG. 3. Volatile media include dynamic memory, such as main memory. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Once all wheel alignment measurements are complete, the computer generates a visual output of the measured alignment parameters and/or provides data relating to adjustments needed to bring the alignment parameters back to original manufacturer's specifications. The computer stores manufacturer-specified values and tolerances for the alignment parameters of many vehicles, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system can provide visual displays and/or printouts, for purposes of billings, reports to the customer, etc.

As part of the vehicle measurement operations, the host computer 111 computes the toe angles of the respective wheels from images of the target heads and determines the amount of correction (if any) required to the respective toe angles of the front and rear wheels.

The angle α of the thrust line from the centerline of the vehicle is also determined by the host computer. For example, the aligner system 100 may compute the thrust line of the vehicle 13, from the toe values (corrected if necessary) of the rear wheels of the vehicle. The thrust line data and other relevant measurement data is stored for use in the subsequent fixture and sensor alignment operations. Knowing the angle α of the thrust line from the centerline of the vehicle, the fixture 19 can thus be aligned so that, for example, its axis extends perpendicular to the thrust line.

Turning now to the fixture 19 and its stand, those of skill in the art will recognize that the fixture adjustment technique may utilize a number of different types of stands for supporting the fixture 19, the adjustment element 17, and the remote image sensor 113. Several examples of such a stand are described below, with reference to FIGS. 4a and 4b.

Figure 4B:
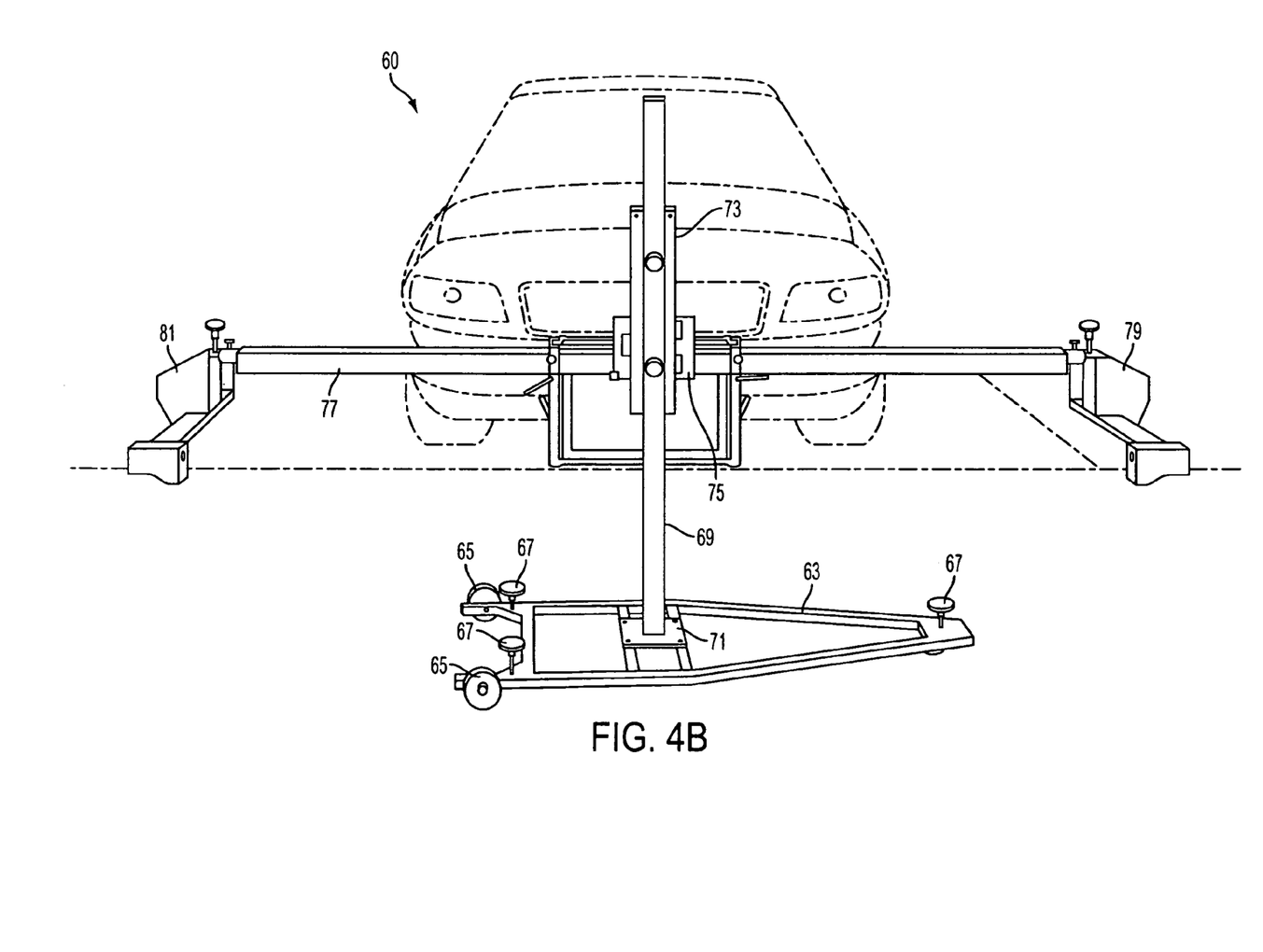

In the example of FIGS. 4a and 4b, the apparatus 60 includes a stand and an adjusting element, in this case, a mirror 61. The mirror 61, here, functions as the adjustment element 17 discussed above. Other adjustment element structures, such as an optical target, could be supported on the stand.

The stand comprises a primary support, including a ground-engaging framework 63. The framework 63 provides tricycle type support at three corners. Two corners of the framework include wheels or rollers 65, for easy movement of the stand. For actual operational support, the tricycle undercarriage framework 63 is adjustably supported on the floor by three adjustable pins 67. The pins 67 are threaded through the material of the framework 63, and each pin 67 has a thumb wheel or the like for turning thereof to adjust the degree of threading of the respective pin through the framework and thereby adjust the height of the respective corner above the supporting floor. In this manner, manual turning of the pins 67 enables angular adjustment of other elements of the device 61 relative to horizontal and vertical axes. Of course, other arrangements of frames and/or plates may be used as the ground-engaging framework.

The stand in the example of FIGS. 4a and 4b also includes central pedestal 69 extending upwardly from a plate 71 of the ground engaging framework 63. The pedestal 69 carries a secondary support, in this example, vertical panel 73. The device 60 further comprises a collar or clamp assembly, generally indicated at 75, which attaches to the vertical panel 73. The collar may be adjustable vertically and locked or clamped in a desired position on the support panel 73.

The clamp 75 in turn supports a carrier, for example, an elongated carrier bar 77, analogous to the fixture 19 of FIG. 1. The attachment of the bar 77 may include one or more elements (not separately visible in the drawings) to allow positional adjustment thereof about the vertical axis in a manner well-known to those skilled in the art. Positional adjustment of the bar 77 provides unified rotational adjustment of the sensor module(s) 79, 81 and the mirror 61 about the substantially vertical axis of the pedestal 69.

The bar 77 carries at least one remote image sensor module, and in the illustrated example, the bar 77 carriers two such modules 79 and 81 at respective opposite ends of the carrier bar 77. In this example, a pair of mounting members 83, 85 are provided at respective opposite ends of the carrier bar 77, so that each sensor module may be adjustably attached at the respective end. The mounting members 83, 85 enable independent rotation of each attached module 79 or 81 about a horizontal axis. This allows pivoting of the remote image sensor module about the horizontal axis, for aligning the sensor field of view with the target heads mounted on the vehicle (see FIG. 2). Once aligned with the camera(s) in the image sensor module(s), the mounting members 79, 81 may be locked or rigidly clamped in position in relation to the bar 77.

In this example, the carrier bar 77 is of sufficient length for locating the auxiliary image sensor modules 79, 81 at the respective ends of the carrier bar 77 so that the target heads are visible when mounted on the wheels of the host vehicle. The bar 77 may provide a spacing similar (e.g. +/−15%) to that provided by the beam 114.

The carrier bar 77 is also adapted for mounting an adjustment element. In this example, the carrier bar 77 is adapted for carrying a light reflector, namely, the mirror 61. However, carrier bar 77 could instead be adapted to carry another type of adjustment element, such as an optical target.

Techniques for positioning a fixture relative to a host vehicle will now be discussed in detail with reference to FIGS. 5a-6b, wherein certain components shown in FIGS. 1 and 2 are represented by the same reference numerals used in FIGS. 1 and 2.

Fixture Calibration

Prior to positioning the fixture 19 relative to the host vehicle 13, the fixture 19 must be calibrated to determine the location of an axis of the fixture intersecting the center C of the fixture relative to the remote image sensor 113. The results of the calibration procedure are then stored in the visual aligner's memory. Thus, the calibration procedure must be performed only once, and thereafter the fixture/remote image sensor assembly can be used to position the fixture.

Figure 5A:
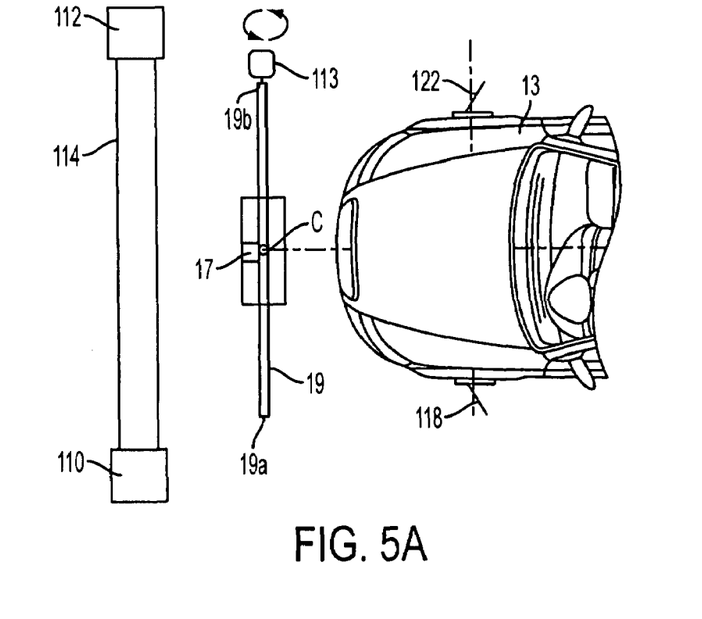
FIGS. 5a and 5b are diagrammatic plan views of a wheel aligner, fixture and vehicle as used to perform a calibration procedure according to the present method.
Figure 5B:
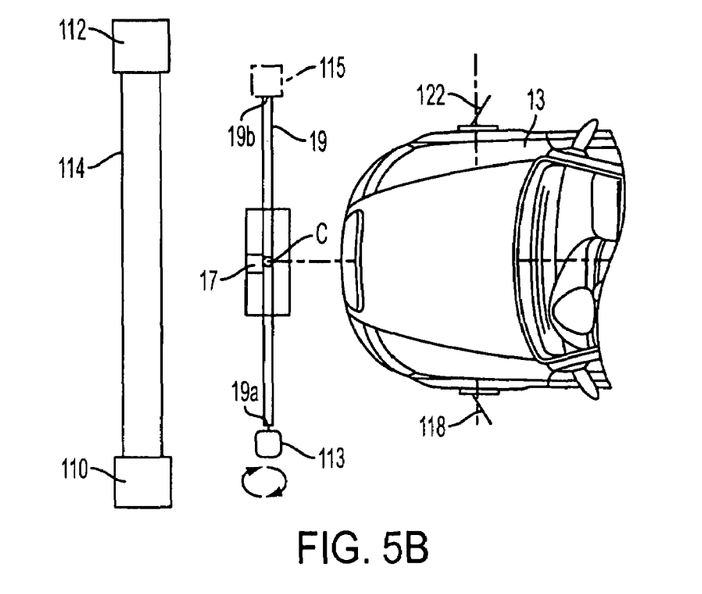

Several alternative techniques for calibrating fixture 19 will now be described. Referring now to FIG. 5a, to begin the calibration procedure, the remote image sensor 113 is rotatably mounted at the predetermining mounting point 19b such that the remote image sensor is rotatable about the axis of the fixture. Predetermined mounting points 19a and 19b are concentric with each other and with an axis of fixture 19, and are equidistant from the center C of fixture 19. The fixture 19 is placed by the technician approximately centered in front of the vehicle 13 (e.g., within a foot) and approximately perpendicular to the front of the vehicle 13 (e.g. within 10 degrees).

Remote image sensor 113 is rotated to obtain images of the optical target 122 in at least two rotational positions. For example, the remote image sensor 113 is rotated downward about 20 degrees such that the target 122 can be seen in the top of its camera's field of view, and an image is obtained; and remote image sensor 113 is rotated upward about 20 degrees such that the target 122 can be seen in the bottom of its camera's field of view, and an image is obtained. The images are then processed by the visual aligner system to determine the location of the remote image sensor 113 relative to the target 122, and this information is used to determine the location of the axis of the fixture 19 relative to the remote image sensor 113, which location is stored by the visual aligner. The location of the center C of the fixture 19 is then determined by measuring a distance between a center of the mounted remote image sensor 113 and the center C of the fixture 19, such as manually using a tape measure, and this information is stored by the visual aligner.

Referring to FIGS. 5a-5b, in another fixture calibration technique, the fixture 19 is positioned to allow imaging of the target 122 with the remote image sensor 113 attached to predetermined mounting point 19b, and to allow imaging of the target 118 with the remote image sensor 113 attached to the predetermined mounting point 19a. The remote image sensor 113 is mounted at the predetermining mounting point 19b (as shown in FIG. 5a), and rotated to obtain images of target 122 in at least two rotational positions as described hereinabove. The remote image sensor 113 is then mounted at the predetermining mounting point 19a (as shown in FIG. 5b), and rotated to obtain images of the target 118 in at least two rotational positions as described hereinabove. The images are then processed by the visual aligner system to determine the location of the mounting points 19a, 19b relative to the targets 118 and 122.

The visual aligner system also calculates the location of each of the targets 118, 122 relative to reference image sensors 110, 112, respectively, and derives a relative target position RTP (i.e. where the targets 118, 122 are located with respect to each other). The images of the target 122 at the at least two rotational positions are processed by the visual aligner system to determine a first axis of rotation of the fixture 19 relative to the remote image sensor 113, and the images of the target 118 at the at least two rotational positions are processed by the visual aligner system to determine a second axis of rotation of the fixture 19 relative to the remote image sensor 113. The first and second axes of rotation of the fixture are combined by the visual aligner system to determine the location of the axis of the fixture 19 relative to the remote image sensor 113. In other words, since the visual aligner knows the locations of targets 118 and 122, and the location of the remote image sensor 113 relative to targets 118 and 122, it can derive the location of the central axis of the fixture 19 in all dimensions. The location of the center C of the fixture 19 relative to the remote image sensor 113 can also be calculated by the visual aligner system, since the center C is equidistant from mounting points 19a, 19b of the remote image sensor 113.

In yet another alternative calibration procedure, two remote image sensors are used instead of only one. FIG. 5b shows a second remote image sensor 115 (in phantom) mounted to mounting point 19b. The calibration procedure using two remote image sensors is the same as described immediately above, except the remote image sensor does not need to be removed from one mounting point and moved to the other during the procedure.

Fixture Positioning

Figure 6A:
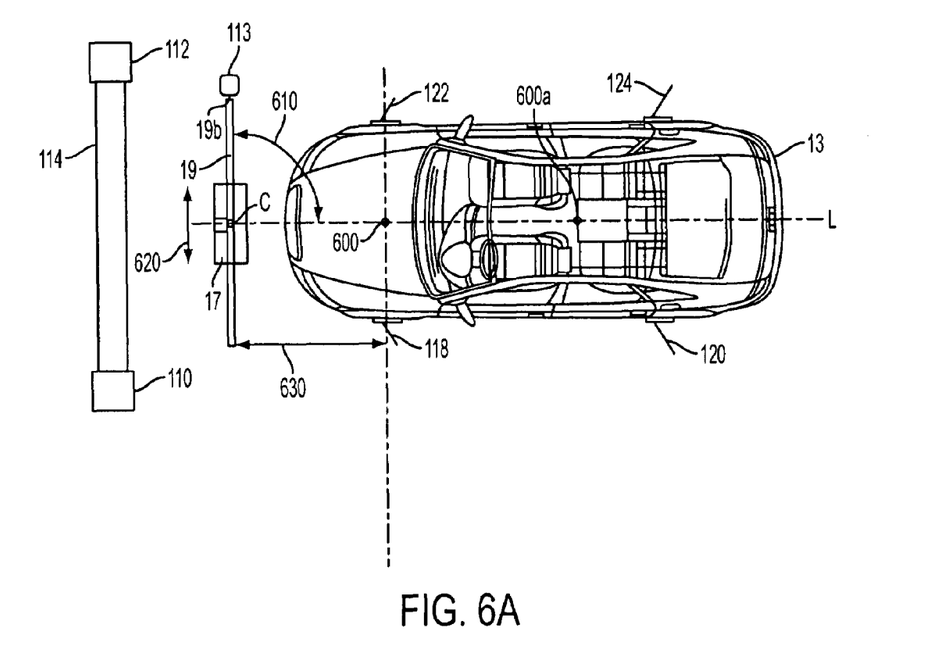
FIG. 6a is a diagrammatic plan view of the wheel aligner, fixture and vehicle of FIGS. 5a and 5b as used to perform positioning of the fixture according to the present method.
Figure 6B:
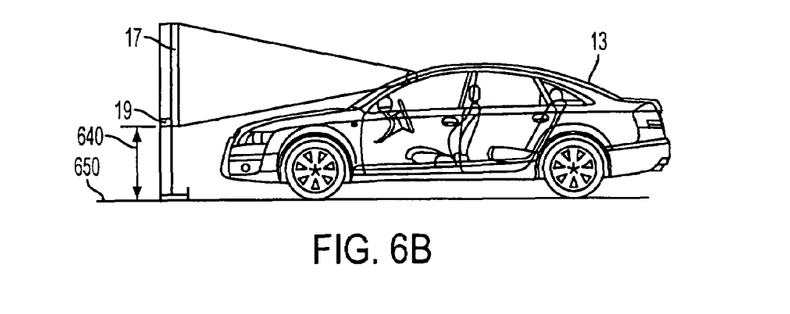

A method of positioning the fixture 19 relative to a vehicle 13 will now be described with reference to FIG. 6. For this exemplary embodiment, locations are calculated relative to a point of origin of the coordinate system of the visual aligner, such as image sensor 110, as explained hereinabove.

Initially, locations of the vehicle-mounted targets 118, 120, 122, 124 are calculated in a known manner based on images of the targets obtained by the reference image sensors 110, 112 of the visual aligner system. A location of a reference point on the vehicle is then calculated. In certain embodiments, the reference point is a center point 600 between a pair of front wheels of the vehicle or a pair of rear wheels of the vehicle. Alternatively, the reference point can be the center of the vehicle itself 600a. A longitudinal line L along a longitudinal axis of the vehicle 13 is also determined using the visual aligner system, such as a thrust line determined in relation to a pair of wheels of the vehicle, typically the rear wheels, in a conventional manner, as explained in detail hereinabove.

A remote image sensor 113 is attached to the fixture 19 at a predetermined mounting point 19b on the fixture 1, and the fixture 19 is positioned to allow imaging of one of the targets; i.e., the target 122, with the attached remote image sensor 113.

Subsequently, a location of the center C of the fixture 19 and a central axis of the fixture 19 is calculated relative to the point of origin of the coordinate system of the aligner; e.g., reference image sensor 110. More particularly, the location of the center C of the fixture and the axis of the fixture relative to the remote image sensor 113 is known from the above-described calibration procedure. The location of the center C of the fixture relative to the target 122 can therefore be calculated after imaging the target 122 with the remote image sensor 113 to obtain the location of the remote image sensor 113 relative to the target 122.

The location of the center C of the fixture relative to the point of origin of the coordinate system of the aligner (e.g., reference image sensor 110) can then be calculated because the aligner knows the calculated location of the center C of the fixture relative to the target 122. The location of the axis of the fixture relative to the point of origin is calculated based on the location of the axis of the fixture relative to the remote image sensor (known from the calibration procedure).

Since the locations of the center C of the fixture 19 and the axis of the fixture 19 in the coordinate system of the aligner are known, the fixture 19 can thereafter be adjusted in several degrees of freedom relative to the vehicle to achieve a desired position or orientation based on comparison steps and angle calculations performed by the aligner, which will now be discussed in detail.

The perpendicularity 610 of the thrust line L to the fixture 19 can be determined by calculating an angle between the thrust line L and the axis of the fixture 19. The fixture 19 is then rotated substantially about its center C based on the results of the calculation of the angle, such that the axis of the fixture 19 is substantially perpendicular to the thrust line L.

The side-to-side location or "offset" 620 of the fixture 19 to the thrust line L can be determined by comparing the intersection of the thrust line L and the axis of the fixture with the center C of the fixture. Specifically, the location of the intersection of the thrust line L and the axis of the fixture 19 is calculated, and then a differential lateral distance from the intersection of the thrust line L and the axis of the fixture to the center of the fixture is determined. The fixture 19 is then moved the differential lateral distance to substantially center the fixture with the thrust line L.

The distance 630 of the fixture 19 from the front of the vehicle 13 can be determined by comparing the location of the center C of the fixture and the location of the reference point 600 or 600a. For example, if the reference point is point 600 in the center of the front wheels, a longitudinal distance 630 from the center C of the fixture to the reference point 600 is calculated, along with a differential longitudinal distance between the longitudinal distance 630 and a predetermined longitudinal distance (i.e., a manufacturer's specification). Thereafter, the fixture 19 is moved the differential longitudinal distance to position the fixture 19 substantially at the predetermined longitudinal distance from the reference point 600.

If the reference point is the center of the vehicle 600a, and comparing the location of the center of the fixture and the location of the reference point comprises: calculating a wheelbase of the vehicle; calculating a longitudinal distance from the center of the fixture to the center of the vehicle; subtracting half the wheelbase from the longitudinal distance; and calculating a differential longitudinal distance between the result of the subtracting step and a predetermined longitudinal distance; the method further comprising moving the fixture the differential longitudinal distance to position the fixture substantially at the predetermined longitudinal distance.

The height 640 of the fixture 19 can be determined by comparing the location of the center C of the fixture and a reference plane 650 calculated by the visual aligner. The reference plane 650 is, for example, a plane through points where the wheels of the vehicle contact the alignment rack 140, and is typically referred to as a "rack plane." The rack plane is determined by finding the vehicle plane as discussed hereinabove, and finding the roll radius of each wheel. The calculation of roll radius is known in the art, and is explained in detail in U.S. Pat. No. 6,237,234, which is incorporated by reference herein in its entirety. A new point is projected down perpendicular to the vehicle plane for each wheel center, and this point is called the rack contact point. The rack plane is the best fit of the 4 rack contact points. Alternatively, a front and a rear plane can be used instead of a best fit plane. The front plane is defined by the front two rack contact points and the midpoint between the two rear contact points. The rear plane is the rear two rack contact points and the midpoint of the front contact points.

To compare the center C of the fixture and reference plane 650, a vertical distance from the center C of the fixture to the reference plane 650, such as a rack plane, is calculated, along with a differential vertical distance between the vertical distance and a predetermined vertical distance (i.e., a manufacturer's specification). The fixture is then moved the differential vertical distance to position the fixture substantially at the predetermined vertical distance from the reference plane 650.

It is also possible to determine whether the axis of the fixture 19 is level, by comparing the location of the axis of the fixture 19 to the reference plane 650 to determine whether they are parallel. The aligner can perform such a comparison because the locations of both the reference plane 650 and the axis of the fixture 19 relative to its coordinate system are known. The fixture is leveled by adjusting the fixture such that the axis of the fixture and the reference plane are substantially parallel.

In operation, a technician operates the aligner system 100 to capture one or more digital images from the camera in the remote image sensor module 113. The host computer 111 processes the signals from the auxiliary camera in the module 113, in the same manner as for the other aligner cameras, to determine the positions and orientations of the front target and possibly the back target in relation to the camera of module 113. The host computer 111 also has determined the positions and orientations of the targets 118, 120, 122, 124 in the aligner coordinate system, from its earlier processing of the images from the modules 110 and 112 during the wheel alignment analysis. The host computer 111 processes the position data derived from the camera of module 113 and the position data for the same target(s) derived from its normal image processing to determine the positions and orientation of the auxiliary camera's coordinate system in the coordinate system of the aligner system 100.

Typically, it is desired to position the fixture 19 within a specified range of locations; for example, perpendicular to the thrust line L of the vehicle 13. If fixture 19 is not perpendicular to thrust line L, the host computer will present an error signal, typically indicating direction and magnitude. The technician can rotate the fixture 19 to reduce or eliminate the error. Then a new image is captured from the camera of the remote image sensor 113. The host computer repeats its analysis of the orientation of the device and again indicates whether the orientation is as desired or if there is an error. This process of adjusting the orientation of the fixture 19 and taking measurements of its orientation is repeated as many times as needed, until the computer indicates the desired orientation of the laser source 51. Those skilled in the art will understand that the other adjustments to the position and orientation of the fixture described hereinabove, such as height, offset, etc. can be performed in the same manner using the visual aligner.

Although described as separate steps, with the speed of today's digital equipment, the fixture adjustment and position indication can proceed in real time. A graphical user interface (GUI) displays, for example, the angle between the thrust line and the fixture, the offset of the fixture, the distance of the fixture in front of the vehicle, etc. It can also have a color of red if an angle or distance is far off, or yellow as the angle or distance gets close, or green if within a specified range. From the user's perspective, if the fixture 19 is part of a stand assembly as shown in FIGS. 4a-4b, they simply operate the appropriate adjustment screws or knobs to position and/or orientate the fixture, while looking at a dial displayed on the computer screen. When the display confirms the desired orientation, the appropriate fastener is tightened or clamped to hold the fixture in the desired position and/or orientation. Once this condition has been met, the fixture is positioned and orientated so that it can be employed to perform a sensor adjustment.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to encompass any and all modifications and variations that fall within the true scope of the present concepts.

What is claimed is:

1. A method of positioning a free-standing fixture relative to a vehicle, using a visual aligner system for imaging vehicle-mounted targets with reference image sensors and processing the resultant images, the method comprising:
    calculating locations of the vehicle-mounted targets based on the images of the targets obtained by the reference image sensors of the visual aligner system;
    calculating a location of a reference point on the vehicle;
    attaching a remote image sensor to the fixture at a predetermined mounting point on the fixture;

positioning the fixture to allow imaging of one of the targets with the attached remote image sensor;

calculating a location of a center of the fixture and an axis of the fixture based on an image of one of the targets obtained by the remote image sensor;

determining a longitudinal line along a longitudinal axis of the vehicle using the visual aligner system;

performing at least one of the steps of:

comparing the intersection of the longitudinal line and the axis of the fixture with the center of the fixture;

comparing the location of the center of the fixture and the location of the reference point;

comparing the location of the center of the fixture and a reference plane calculated by the visual aligner; and comparing the location of the axis of the fixture and the reference plane; and adjusting the fixture relative to the vehicle to achieve a desired position or orientation of the fixture based on the performed at least one of the comparison steps.

2. The method of claim 1, wherein the respective locations of the targets, the reference point, the center of the fixture and the axis of the fixture are calculated relative to a point of origin of a coordinate system, wherein calculating the location of the center of the fixture and the axis of the fixture comprises:

determining a location of the center of the fixture, and a location of an axis of the fixture intersecting the center of the fixture, relative to the remote image sensor;

calculating a location of the center of the fixture relative to one of the targets of the visual aligner system based on at least one image of the target obtained by the remote image sensor;

calculating the location of the center of the fixture relative to the point of origin based on the calculated location of the center of the fixture relative to the one of the targets; and calculating the location of the axis of the fixture relative to the point of origin based on the location of the axis of the fixture relative to the remote image sensor.

3. The method of claim 1, wherein determining the longitudinal line comprises operating the visual aligner system to calculate a thrust line determined in relation to a pair of wheels of the vehicle.

4. The method of claim 1, wherein comparing the intersection of the longitudinal line and the axis of the fixture with the center of the fixture comprises:

calculating the location of the intersection of the longitudinal line and the axis of the fixture; and calculating a differential lateral distance from the intersection of the longitudinal line and the axis of the fixture to the center of the fixture;

wherein the adjusting step comprises moving the fixture the differential lateral distance to substantially center the fixture with the longitudinal line.

5. The method of claim 1, wherein comparing the location of the center of the fixture and the location of the reference point comprises:

calculating a longitudinal distance from the center of the fixture to the reference point; and calculating a differential longitudinal distance between the longitudinal distance and a predetermined longitudinal distance;

wherein the adjusting step comprises moving the fixture the differential longitudinal distance to position the fixture substantially at the predetermined longitudinal distance from the reference point.

6. The method of claim 1, wherein the respective locations of the targets, the reference point, the center of the fixture and the axis of the fixture are calculated relative to a point of origin of a coordinate system.

7. The method of claim 1, wherein comparing the location of the center of the fixture and the reference plane comprises:

calculating a vertical distance from the center of the fixture to the reference plane; and calculating a differential vertical distance between the vertical distance and a predetermined vertical distance;

wherein the adjusting step comprises moving the fixture the differential vertical distance to position the fixture substantially at the predetermined vertical distance from the reference plane.

8. The method of claim 1, wherein calculating the location of the reference point on the vehicle comprises calculating a location of a center point between a pair of front wheels of the vehicle or a pair of rear wheels of the vehicle.

9. The method of claim 1, wherein the reference point is the center of the vehicle, and comparing the location of the center of the fixture and the location of the reference point comprises:

calculating a wheelbase of the vehicle;

calculating a longitudinal distance from the center of the fixture to the center of the vehicle;

subtracting half the wheelbase from the longitudinal distance; and calculating a differential longitudinal distance between the result of the subtracting step and a predetermined longitudinal distance;

the method further comprising moving the fixture the differential longitudinal distance to position the fixture substantially at the predetermined longitudinal distance.

10. The method of claim 1, wherein the fixture comprises a substantially horizontal bar, and the predetermined mounting point for the remote image sensor is disposed at a distal end of the bar.

11. The method of claim 2, wherein determining the location of the axis of the fixture intersecting the center of the fixture relative to the remote image sensor comprises:

rotatably mounting the remote image sensor at the predetermining mounting point such that the remote image sensor is rotatable about the axis of the fixture;

rotating the remote image sensor to obtain images of one of the optical targets in at least two rotational positions; and processing the images of the target at the at least two rotational positions to determine the location of the axis of the fixture relative to the remote image sensor.

12. The method of claim 2, wherein determining the location of the center of the fixture comprises measuring a distance between a center of the mounted remote image sensor and the center of the fixture.

13. The method of claim 2, wherein determining the location of the axis of the fixture intersecting the center of the fixture relative to the remote image sensor comprises:

providing the fixture with first and second predetermined mounting points equidistant from the center of the fixture for rotatably mounting the remote image sensor such that the remote image sensor is rotatable about the axis of the fixture;

positioning the fixture to allow imaging of a first one of the targets with the remote image sensor attached to the first predetermined mounting point, and of a second one of the targets with the remote image sensor attached to the second predetermined mounting point;

mounting the remote image sensor at the first predetermining mounting point;

rotating the remote image sensor to obtain images of the first optical target in at least two rotational positions;
mounting the remote image sensor at the second predetermining mounting point;
rotating the remote image sensor to obtain images of the second optical target in at least two rotational positions;
processing the images of the first target at the at least two rotational positions to determine a first axis of rotation of the fixture relative to the remote image sensor;
processing the images of the second target at the at least two rotational positions to determine a second axis of rotation of the fixture relative to the remote image sensor; and
combining the first and second axes of rotation of the fixture to determine the location of the axis of the fixture relative to the remote image sensor.

14. The method of claim 13, wherein determining the location of the center of the fixture relative to the remote image sensor comprises processing the images of the first and second targets obtained by the remote image sensor, and the images of the first and second targets obtained by the reference image sensors.

15. The method of claim 2, wherein determining the location of the axis of the fixture intersecting the center of the fixture relative to the remote image sensor comprises:
providing the fixture with first and second predetermined mounting points equidistant from the center of the fixture for rotatably mounting first and second remote image sensors such that the remote image sensors are rotatable about the axis of the fixture;
positioning the fixture to allow imaging of a first one of the targets with the first remote image sensor attached to the first predetermined mounting point, and of a second one of the targets with the second remote image sensor attached to the second predetermined mounting point;
mounting the first remote image sensor at the first predetermining mounting point, and the second remote image sensor at the second predetermining mounting point;
rotating the first remote image sensor to obtain images of the first optical target in at least two rotational positions;
rotating the second remote image sensor to obtain images of the second optical target in at least two rotational positions;
processing the images of the first target at the at least two rotational positions to determine a first axis of rotation of the fixture relative to the first remote image sensor;
processing the images of the second target at the at least two rotational positions to determine a second axis of rotation of the fixture relative to the second remote image sensor; and
combining the first and second axes of rotation of the fixture to determine the location of the axis of the fixture relative to the remote image sensors.

16. The method of claim 15, wherein determining the location of the center of the fixture relative to the remote image sensor comprises processing the images of the first and second targets obtained by the remote image sensors, and the images of the first and second targets obtained by the reference image sensors.

17. The method of claim 1, wherein comparing the location of the axis of the fixture to the reference plane comprises determining whether the axis of the fixture and the reference plane are parallel; and
wherein the adjusting step includes leveling the fixture by adjusting the fixture such that the axis of the fixture and the reference plane are substantially parallel.

18. The method of claim 1, comprising calculating an angle between the longitudinal line and the axis of the fixture, and adjusting the fixture relative to the vehicle to achieve the desired orientation of the fixture based on the result of the angle calculation.

19. The method of claim 18, wherein the adjusting step comprises rotating the fixture substantially about the center of the fixture based on the results of the calculation of the angle, such that the axis of the fixture is substantially perpendicular to the longitudinal axis.

20. The method of claim 1, wherein the reference plane is a plane through points where wheels of the vehicle contact an alignment rack.

* * * * *